(No Model.)
F. DÜRR.
APPARATUS FOR THE REDUCTION OF PETROLEUM INTO GAS.
No. 445,982. Patented Feb. 10, 1891.
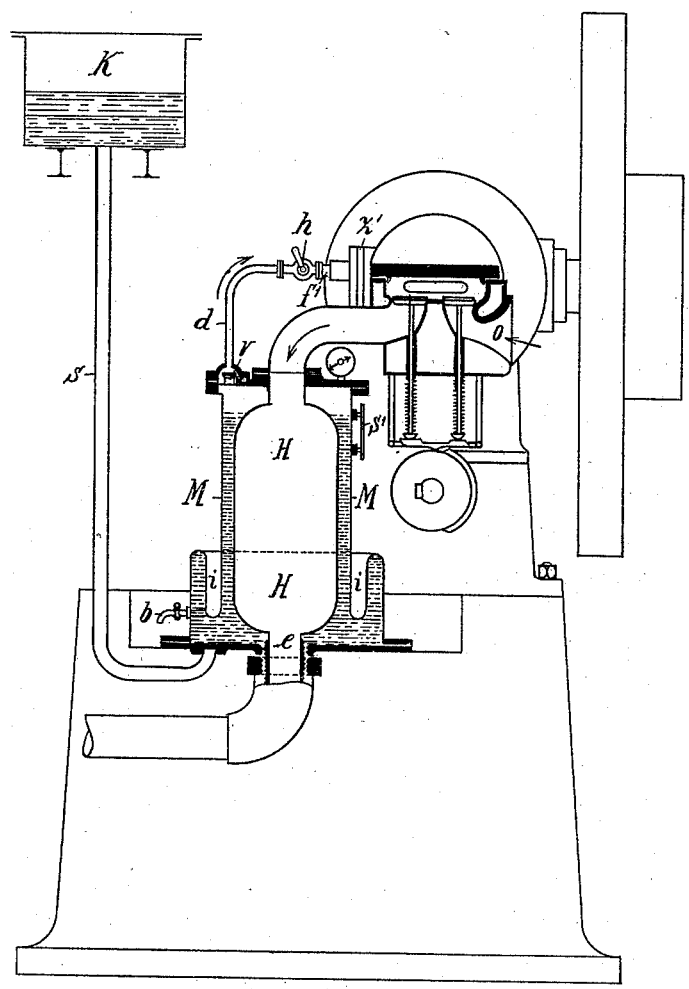

UNITED STATES PATENT OFFICE.

FRITZ DÜRR, OF MUNICH, GERMANY.

APPARATUS FOR THE REDUCTION OF PETROLEUM INTO GAS.

SPECIFICATION forming part of Letters Patent No. 445,982, dated February 10, 1891.

Application filed April 15, 1890. Serial No. 348,057. (No model.) Patented in Belgium December 31, 1889, No. 88,839.

*To all whom it may concern:*

Be it known that I, FRITZ DÜRR, of Munich, Bavaria, German Empire, have invented a new and useful Improvement in Apparatus for the Reduction of Petroleum into Gas, (for which I have obtained a patent in Belgium, No. 88,839, dated December 31, 1889,) of which the following is a specification.

This invention relates to a new apparatus for the reduction of petroleum into gas; and it consists in the various features of improvement more fully pointed out in the claim.

The accompanying drawing represents a vertical central section of my improved apparatus.

The letter M represents an annular evaporating-vessel inclosing a heating-body H, and provided with an annular trough $i$. This trough receives the alcohol or other fuel which imparts the heat to the two walls of the reservoir by which the trough is formed. The vessel M is closed by a cover provided with a manometer. From the cover there projects upwardly a vapor-pipe $d$, provided with safety-valve $v$, cock $h$, and stuffing-box $f'$. At its lower end the vessel M connects with a stand-pipe $s$, that leads to an elevated tank K, situated above vessel M, as shown.

$e$ is the bottom of the vessel M, $s'$ a gage, and $b$ the discharge cock.

The alcohol being ignited heats the vessel M and evaporates the petroleum therein contained. The apparatus should work under a pressure of about 0.2 atmosphere, which is indicated by the manometer. The distance between the surface of the petroleum in vessel M and the surface of the petroleum in tank K is equal to a column of petroleum that represents this pressure. After sufficient vapor has formed, the motor is started in the usual manner.

In the drawing, a slide $z'$ is used for admitting the petroleum-vapor. The fuel is extinguished if the body H, by the discharged gases, has been so highly heated that they themselves can evaporate the necessary quantity of petroleum. This point can be readily ascertained by trials for each motor. If the pressure becomes too great, the column of petroleum presses toward the tank K, and as this is made of considerable area an overflow will not take place. Moreover, the stand-pipe $s$ can be provided with ribs or a jacket containing cooling water. At increased pressure the evaporating-surface accordingly decreases, and as the units of heat supplied are constant the variations of tension can only be slight. The air is admitted to the motor by an ordinary suction-valve $o$.

What I claim is—

In a gas-engine, the combination of evaporating-vessel M, having annular heating-trough $i$, with tank K, which is placed above vessel M, and a stand-pipe $s$, that connects the tank with the bottom of the vessel, substantially as specified.

In testimony whereof I have signed this specification in the presence of two subscribing witnesses.

FRITZ DÜRR.

Witnesses:
ANCIÈ RUEAN,
EMIL HENZEL.